United States Patent
Chopra et al.

(10) Patent No.: US 11,228,381 B2
(45) Date of Patent: *Jan. 18, 2022

(54) CHANNEL SOUNDING USING CARRIER AGGREGATION

(71) Applicant: AT&T Intellectual Property I, L.P., Atlanta, GA (US)

(72) Inventors: Aditya Chopra, Austin, TX (US); Saeed Ghassemzadeh, Austin, TX (US); Arunabha Ghosh, Austin, TX (US); Ralf Bendlin, Cedar Park, TX (US); Salam Akoum, Austin, TX (US); SaiRamesh Nammi, Austin, TX (US); Thomas Novlan, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/773,581

(22) Filed: Jan. 27, 2020

(65) Prior Publication Data

US 2020/0162174 A1 May 21, 2020

Related U.S. Application Data

(63) Continuation of application No. 15/852,628, filed on Dec. 22, 2017, now Pat. No. 10,547,397.

(51) Int. Cl.
*H04L 12/26* (2006.01)
*H04B 17/309* (2015.01)
*H04B 17/318* (2015.01)
*H04B 17/391* (2015.01)

(52) U.S. Cl.
CPC ......... *H04B 17/309* (2015.01); *H04B 17/318* (2015.01); *H04B 17/391* (2015.01)

(58) Field of Classification Search
None
See application file for complete search history.

(56) References Cited

U.S. PATENT DOCUMENTS

| | | | |
|---|---|---|---|
| 8,160,008 B2 | 4/2012 | McCoy | |
| 8,351,411 B2 | 1/2013 | Kim et al. | |
| 8,837,394 B2 | 9/2014 | Lin et al. | |
| 9,210,736 B2 | 12/2015 | Kim et al. | |
| 9,294,243 B2 | 3/2016 | Lee et al. | |
| 9,369,918 B2 | 6/2016 | Grandhi et al. | |
| 9,585,188 B2 | 2/2017 | Jang et al. | |
| 10,547,397 B2 * | 1/2020 | Chopra | H04B 17/318 |

(Continued)

*Primary Examiner* — Phirin Sam

(57) ABSTRACT

An example method may include a processing system of a channel sounding receiver having a processor receiving from a base station, at a location, a channel sounding waveform via a plurality of carriers, sampling the channel sounding waveform via the plurality of carriers to generate a plurality of per-carrier time domain sample sets, and processing the plurality of per-carrier time domain sample sets via a plurality of discrete Fourier transform modules to provide a plurality of per-carrier frequency domain sample sets. The method may further include the processing system aligning the plurality of per-carrier frequency domain sample sets in gain and phase to provide a combined frequency domain sample set and measuring a channel property at the location based upon the combined frequency domain sample set.

20 Claims, 4 Drawing Sheets

(56) References Cited

U.S. PATENT DOCUMENTS

| | | | |
|---|---|---|---|
| 2010/0202504 A1* | 8/2010 | Murali | H04L 25/022 |
| | | | 375/232 |
| 2012/0032855 A1* | 2/2012 | Reede | G01S 13/82 |
| | | | 342/458 |
| 2015/0163036 A1 | 6/2015 | Thomas et al. | |
| 2016/0164708 A1 | 6/2016 | Dahlman et al. | |
| 2016/0295610 A1 | 10/2016 | Grandhi et al. | |
| 2017/0019928 A1* | 1/2017 | Viraraghavan | H04L 27/261 |
| 2017/0141900 A1 | 5/2017 | McCoy | |
| 2017/0181192 A1 | 6/2017 | Agrawal et al. | |
| 2017/0310439 A1 | 10/2017 | Yang et al. | |
| 2017/0339569 A1* | 11/2017 | Khandani | H04L 1/1825 |
| 2018/0109346 A1 | 4/2018 | Sivanesan et al. | |
| 2018/0159637 A1 | 6/2018 | Taher et al. | |
| 2018/0213435 A1 | 7/2018 | Kim et al. | |
| 2019/0020522 A1 | 1/2019 | Sun et al. | |
| 2019/0058533 A1 | 2/2019 | Ghosh et al. | |
| 2019/0059010 A1 | 2/2019 | Ghosh et al. | |
| 2019/0059064 A1 | 2/2019 | Ghosh et al. | |
| 2019/0068352 A1 | 2/2019 | Xiong et al. | |
| 2019/0089391 A1 | 4/2019 | Hakkola | |
| 2019/0199457 A1 | 6/2019 | Chopra et al. | |
| 2020/0351072 A1* | 11/2020 | Khandani | H04L 1/1896 |

* cited by examiner

CHANNEL SOUNDING USING CARRIER AGGREGATION

This application is a continuation of U.S. patent application Ser. No. 15/852,628, filed Dec. 22, 2017, now U.S. Pat. No. 10,547,397, which is herein incorporated by reference in its entirety.

The present disclosure relates generally to wireless channel measurements, and more particularly to devices, non-transitory computer readable media, and methods for channel sounding using carrier aggregation.

BACKGROUND

The spatial, temporal and frequency characterization of the wireless channel in various environments is called "channel characterization." The characterization provides a set of parameters which fully explain the medium's behavior in various scenarios. A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), shadow fading, cross-polarization ratios, and the like as experienced by a user equipment or base station. In one implementation, a wireless channel sounder may utilize a directional antenna. For instance, to measure AoA using a directional antenna, the antenna may be turned in incremental steps to measure the RSS. The AoA is recorded where the RSS is at a maximum.

SUMMARY

In one example, the present disclosure discloses a method, computer-readable medium, and device for channel sounding using carrier aggregation. For example, a method may include a processing system of a channel sounding receiver having a processor receiving from a base station, at a location, a channel sounding waveform via a plurality of carriers, sampling the channel sounding waveform via the plurality of carriers to generate a plurality of per-carrier time domain sample sets, and processing the plurality of per-carrier time domain sample sets via a plurality of discrete Fourier transform modules to provide a plurality of per-carrier frequency domain sample sets. The method may further include the processing system aligning the plurality of per-carrier frequency domain sample sets in gain and phase to provide a combined frequency domain sample set and measuring a channel property at the location based upon the combined frequency domain sample set.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
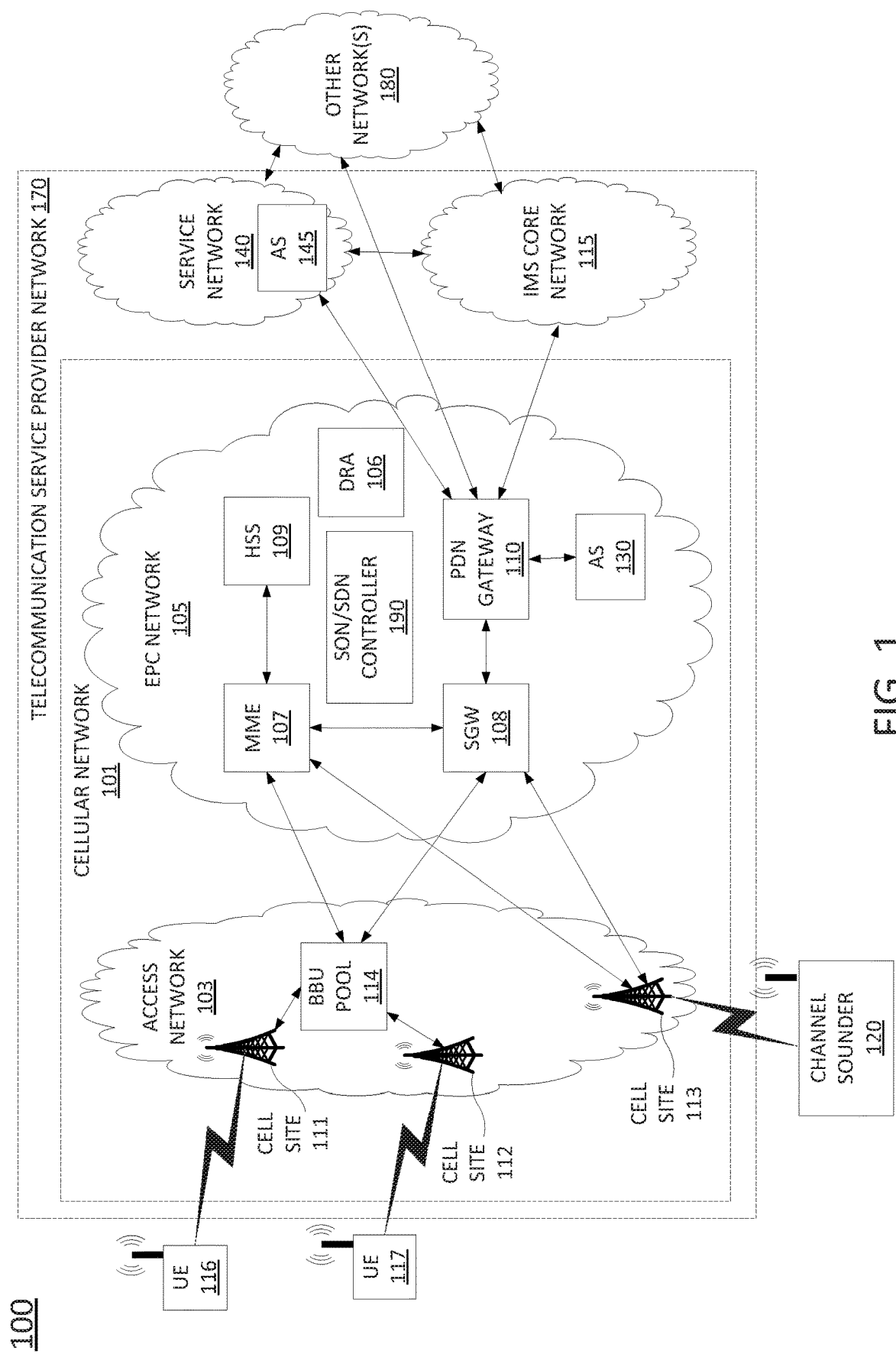
FIG. 1 illustrates a block diagram of an example system, in accordance with the present disclosure.

The present disclosure broadly discloses methods, computer-readable media, and devices for channel sounding using carrier aggregation. For instance, the availability of millimeter wave spectrum for 3rd Generation Partnership Project (3GPP) 5G deployments gives rise to many opportunities for telecommunications services. Traditional cellular wireless communications networks, however, have not operated in these bands.

In general, a wireless channel sounding system may comprise a transmitter and a receiver for measuring wireless channel related parameters such as a complex impulse response of the wireless channel, a path loss, an excess delay, a root-mean-square (RMS) delay spread, a Doppler spread, a fade rate, an angle of arrival (AoA) or angle of departure (AoD), a shadow fading, a cross-polarization ratio, and the like as experienced by a user equipment or base station. The measurements of the wireless channel related parameters under a variety of test conditions enable the modeling of the behavior for these channel parameters under different scenarios and conditions, as well as the simulation and prediction of the performance of a base station or a user equipment under such scenarios and conditions. Thus, modeling of these wireless channel related parameters and using them in end-to-end network simulators can guide in mapping out the details of where and how to place transmitters and receivers in a network for the best mobile performance and experience.

The bandwidth of a signal that is used for channel sounding gives snapshot of the channel/medium at a particular bandwidth. For instance, transmitting and receiving at 200 MHz bandwidth may capture information about the channel at 200 MHz. Similarly, transmitting and receiving at 1 GHz bandwidth may capture information about the channel at 1 GHz. To illustrate, a 200 MHz signal results in about 5 nanoseconds time delay resolution. However, an 800 MHz signal can be used to improve time delay resolution of the same channel to better resolve multipath.

In one example, the 5G NR base station can transmit across the entire bandwidth, e.g., 400 MHz, 800 MHz, 1 GHz, etc. of a wideband channel sounding waveform. In accordance with the present disclosure, carrier aggregation comes into play where different parts of the UE receiver process different smaller parts of the spectrum, e.g., 50-200 MHz carriers, and then recombine frequency domain information in the backend to give the wideband characterization of the channel. For instance, after gain and phase alignment of different receive paths, the two frequency domain responses are joined to provide the overall frequency domain response.

Examples of the present disclosure may use the existing 5G network infrastructure that is already in the field. Accordingly, channel sounding may be performed on a large scale since every network base station can be potentially changed into a sounding transmitter. In one example, equipment, waveforms, and carrier aggregation that are based upon the specification of the considered wireless cellular communications standard (e.g., 3GPP 5G) may be employed so that wideband channel models may be generated based upon channel property measurements using equipment with narrowband radio frequency (RF) front-ends.

In accordance with the present disclosure, a channel sounding system is described that uses the transceivers and baseband processors of a deployed/in-service wireless cellular communications system for channel sounding. In particular, deployed/in-service base stations transmit wideband channel sounding waveforms, where "wideband" indicates a wireless signal transmitted across a frequency range that is broader than a single carrier, also referred to as a "component carrier." A channel sounding receiver may receive portions of the wideband channel sounding waveform through several receive paths assigned to different (component) carriers using carrier aggregation (CA), and then recombine the portions for channel property measurements in a digital back-end.

In a first example, channel sounding waveforms are inserted into blank resources of a time-frequency resource grid of a base station. In one example, the blank resources comprise time-frequency resources reserved by the network for future use cases, services, and/or applications. Alternatively, or in addition, the blank resources may comprise legacy reserved resources of a base station time-frequency grid (e.g., which have subsequently been released and are no longer utilized for the reserved purpose). The channel sounding waveforms may be based on existing waveforms that are modified for the purpose of channel sounding or, alternatively, existing or new waveforms may be utilized that are solely or primarily for the purpose of channel sounding. Notably, the present example avoids the need to deploy a dedicated channel sounding transmitter at the base station transceiver location to sound the channel. Instead, the base station transceiver and baseband processor itself are used as the transmitter.

As stated above, the channel sounding waveforms may comprise wideband signals that are suitable for use in connection with carrier aggregation at a channel sounding receiver. Thus, in accordance with the present disclosure, the blank resources assigned to a channel sounding waveform may span a frequency range that extends across at least two component carriers. In one example, the base station transceiver inserts channel sounding waveforms into the time-frequency grid, e.g., a 5G "new radio" (NR) waveform, and uses the aforementioned reserved resources to inform the UEs that coexist in the network with the channel sounder receiver about the characterization parameters of the channel sounding waveform, such as the associated rate matching behavior and/or measurement restrictions. In the case of time domain processing, in one example the channel sounding waveform occupies a blank resource of the time-frequency grid but does not have any kind of alignment with the grid. By way of example and without any limitation, a Zadoff-Chu (ZC) sequence in the time domain may be used for channel sounding. In yet another example, in the case of frequency domain processing, the sounding signal may be inserted before an inverse Fast Fourier Transform (iFFT) stage in the transmitter. In either case, the receiver processing can be done in the time domain or frequency domain. In the latter case, however, the channel sounding waveform may be aligned with the frequency sub-carriers of the time-frequency grid.

In addition to the indication of the configuration of the blank/reserved resources, a channel sounding receiver may be configured with a copy of the channel sounding waveform/sequence which will be transmitted in a subset of the blank/reserved resources. The channel sounding receiver may also be configured with other characterization parameters, such as a waveform/sequence indication, timing indication (e.g., periodicity, offset, and the like), and frequency location (e.g., carrier identification(s), sub-band index, sub-carrier density, grid alignment, transmission bandwidth, and so forth). These parameters may be provided by higher layer signaling (e.g., at the radio resource control (RRC) layer), via pre-configuration, or at the application layer.

In another example, a channel sounder may request an "on-demand" configuration of the blank/reserved resources and corresponding channel sounding waveform/sequence transmission. Thus, the network may conserve resources and mitigate potential sources of interference for other user data by avoiding transmission of the channel sounding waveform/sequences unless a channel sounder is present and actively taking measurements. This indication from the channel sounder may be performed as part of a scheduling request message, other higher layer signaling, or at the application layer, and may include a request for transmission of the channel sounding waveform/sequence and corresponding characterization parameters such as transmission duration, periodicity, bandwidth, particular carriers, sub-carrier density, transmission power, and so forth.

In a second example, a channel sounding system may use the transceivers and baseband processors of a deployed/in-service wireless cellular communications system for channel sounding using standardized waveforms. In particular, the channel sounding is based on waveforms that are already available from other procedures, such as those for time/frequency synchronization, phase tracking, positioning estimation, and channel state information estimation. To illustrate, in one example, the channel sounding may be based upon one or more components of the synchronization signal (SS) block of the time-frequency grid of a base station, e.g., a "new radio" NR synchronization signal (SS) block, which may contain a primary synchronization signal (PSS), a secondary synchronization signal (SSS), a physical broadcast channel (PBCH), and a downlink modulation reference signal (DMRS), to measure one or more channel properties, or parameters, that characterize the channel.

It should be noted that an NR SS block is typically a narrowband signal (e.g., 40 MHz) and therefore may not be suitable for carrier aggregation-based channel sounding in this form. Thus, in one example, the PSS of the NR SS block is extended in frequency to create a wideband signal without changing the narrowband part of the PSS which a UE would expect (e.g., if the UE is operating according to 5G or similar wireless communications standard that specifies a narrowband PSS). Other components of a synchronization signaling (SS) block, such as a secondary synchronization signal (SSS), a physical broadcast channel (PBCH), and a downlink modulation reference signal (DMRS) may similarly be extended in frequency to create a wideband signal that is usable for carrier aggregation-based channel sounding. In one example, the frequency domain extension of one or more SS block components may utilize one or more blank resources, as described above.

In one example, the measurements of channel properties may be derived from multiple signals within the SS block. The time/frequency location of the SS block within the time-frequency grid of the base station may be blindly detected by a channel sounder as part of an initial access procedure, or may be provided by higher layer signaling, such as at the radio resource control (RRC) layer, by pre-configuration, by the application layer, etc. Notably, channel sounding based upon the synchronization signaling (SS) block does not require the channel sounder (or "channel sounding receiver") to implement the full physical layer specification (e.g., for 5G NR deployment), but only the aspects of the initial access procedure pertaining to synchronization signal detection and measurement. This allows the channel sounder to perform the channel sounding measurements of the channel properties without transmitter capability.

In one example, channel sounding may be based upon one or more reference signals, such as a channel state information (CSI) reference signal (RS). In other words, the CSI-RS of a deployed/in-service base station/cell site may be used to measure channel properties that characterize the channel. When used for channel sounding in accordance with the present disclosure, the CSI-RS waveform/sequence may be referred to as a channel sounding waveform. Using CSI-RS allows for MIMO (e.g., multi-port) and wideband measurements (e.g., delay spread). More precisely, for CSI measurement, a base station (e.g., a "gNodeB" or "gNB" in emerging 5G terminology) may typically select a transmit beam that is best suited for the receiver. However, for the purposes of channel sounding, the CSI-RS may instead be beam swept at the base station/cell site transmitter. In this regard, it should be noted that in one example, beam sweeping of the CSI-RS may be made part of a permitted beam management procedure defined in the specification of the considered wireless cellular communications standard (e.g., 3GPP 5G). If, however, existing or emerging standards effectively prevent the CSI-RS from being beam swept, in another example, the base station transmitter may configure reserved resources and transmit beam swept CSI-RS for sounding purposes in the configured reserved resources. For instance, reserved resources are described above in connection with the first example of the present disclosure and may comprise blank resources that are set aside for future and/or legacy compatibility.

In one example, when CSI-RS is used for channel sounding, the CSI-RS density can be increased by configuring multiple CSI-RS resources, all of which may use the same sequence. In other words, the CSI-RS may be transmitted as a wideband signal across a range of frequencies for reception using carrier aggregation at a channel sounding receiver. In this example, the channel sounding receiver can aggregate the CSI-RS from multiple resources to obtain processing gain. Moreover, in order to establish over-the-air (OTA) calibration between the channel sounding transmitter (e.g., a base station) and channel sounding receiver, multiple CSI-RS resources can be aggregated to form per-antenna-element antenna ports, e.g., using a special analog precoder in the radio frequency (RF) domain. In such an example, the channel sounding receiver can use these per antenna element antenna ports to estimate the phase offset between antenna elements.

In yet another example, channel sounding may be based upon positioning reference signals (PRS) that are transmitted by a base station. PRSs are typically received by a UE from several base stations, and are used to determine its position based upon time differences in the receipt of the several PRSs relative to reference timing signal. However, in accordance with the second example of the present disclosure, the PRS may be used to measure channel properties that characterize the channel. When used for channel sounding in accordance with the present disclosure, the PRS waveform/sequence may be referred to as a channel sounding waveform. Similar to other channel sounding waveforms described above, in accordance with the present disclosure, the PRS may be transmitted as a wideband signal across a range of frequencies for reception using carrier aggregation at a channel sounding receiver.

In a third example, a channel sounding system may use the transceivers and baseband processors of a deployed/in-service wireless cellular communications system for channel sounding using non-random predetermined bit sequences. In particular, a non-random/pseudo-random predetermined bit sequence is transmitted on a shared data channel and the resulting waveform generated from the pseudo-random bit sequence ("data") is used for channel sounding. The bit sequence is predetermined insofar as it is selected in advance (e.g., by the base station) or the channel sounding receiver. Accordingly, the resulting waveform may be referred to as a "channel sounding waveform." Like the first and second examples, the third example of the present disclosure allows channel sounding to be used during installation time (e.g., for a fixed wireless broadband (FWB) deployment) to determine the best location and orientation of the customer premise equipment (CPE). The third example also obviates the need to install a channel sounding transmitter at the base station transceiver location to sound the channel. Instead, the base station transceiver and baseband processor itself can be used as the transmitter.

In one example, the pre-determined bit sequence for a channel sounding waveform is inserted in the bit domain as a medium access control (MAC) transport block, while the physical layer processing remains in accordance with the wireless cellular communications standard that is implemented by the base station transmitter. To illustrate, the generating and transmitting of a channel sounding waveform may proceed as follows. First, the base station MAC scheduler may allocate the entire available transmission bandwidth to the physical data shared channel (PDSCH) of a channel sounding receiver. In one example, the MAC scheduler may also set the transmit rank of said PDSCH to 1. In addition, in one example, the MAC scheduler may also set a modulation coding scheme (MCS) to lowest available MCS of the PDSCH. For example, the lowest MCS level may be associated with binary phase shift keying (BPSK), quadrature phase shift keying (QPSK), or other modulation schemes are possible for association with the lowest MCS level. Alternatively, the MAC scheduler may not choose the lowest MCS level but another MCS level. In still another example, the MAC scheduler may assign a transmission scheme not associated with a precoding matrix indicator (PMI) with the PDSCH, e.g., one based on pre-coder cycling.

The MAC scheduler may next set the payload (data) part of the MAC protocol data unit (PDU) to a predetermined bit sequence. The predetermined bit sequence (e.g., a pseudo-random set of bits) effectively creates the transport block for that transmission time interval (TTI). It should be noted that the transport block bits are typically not known in advance at the receiver. However, in this case, the transport block bits (the predetermined bit sequence) are known at the receiver (i.e., the channel sounding receiver). The channel sounding receiver may also store various parameters associated with the predetermined bit sequence and/or characterizing the channel sounding waveform that is generated from the predetermined bit sequence, such as: code rate, redundancy version, modulation level, precoding matrix indicator (PMI), resource mapping, and so forth. Accordingly, in one example, the entire PDSCH is a known wideband signal at the channel sounding receiver and may be received using carrier aggregation.

In another example, the base station transmitter sets the payload or data part of a radio link control (RLC) PDU to a predetermined bit sequence (where the predetermined bit sequence is associated with a channel sounding waveform to be transmitted). In a further example, the base station transmitter sets the payload or data part of the Packet Data Convergence Protocol (PDCP) PDU to a predetermined bit sequence. In still another example, an OCNS (orthogonal channel noise simulator) at the base station (e.g., a gNodeB) is used to generate a pre-determined pseudo-random sequence which is inserted into the physical layer (PHY) processing unit at the transport block level. In this example, the MAC at the gNodeB may use the entire bandwidth available for the PDSCH to generate the predetermined pseudo-random sequence and does not allocate any resources to another user equipment. It should be noted that the predetermined pseudo-random sequence may be notified in advance to the channel sounding receiver, e.g., via control signaling.

Other points in the protocol stack where the predetermined bit sequence may be included as the payload or data part of a PDU or service data unit (SDU) are also within the scope of the third example. Generally, the higher in the protocol stack of the considered wireless cellular communications standard, the easier the example is implementable within the confines of the considered wireless cellular communications standard. In another example, the base station (e.g., a gNodeB) uses forward compatible blank resources that are not available to other UEs, and uses these blank resources to generate a wideband signal using the NR physical layer that is suitable for reception via carrier aggregation at the channel sounding receiver. (Forward compatible black resources are described in greater detail above in connection with the first example).

In one example, sequence numbers may not be known in advance when the predetermined bit sequence is included as the payload or data part in higher layers of the protocol stack. In addition, although the base station transmitter may insert the predetermined bit sequence at different layers of the protocol stack, the channel sounding receiver may process the received predetermined set of bits at the physical layer as part of the channel sounding measurement procedure without passing the payload to higher layers in the channel sounding receiver's protocol stack. Thus, the received channel sounding waveform may be directly processed within the physical layer, or may be stored/transported for processing in real-time or at a later time by the channel sounding receiver or by a different device or system.

In one example, the channel sounding receiver may be preconfigured with the predetermined bit or may be provided with the predetermined bit sequence and corresponding characterization parameters for channel measurement based on higher layer signaling (e.g., at the RRC layer or application layer). The channel sounding receiver may be provided with the exact bits of the sequence or one or more initialization parameters, such as a pseudo-random sequence seed which may be a function of one or more parameters including system frame number, slot index, symbol index, (virtual) cell identifier (ID), and/or user equipment (UE) ID (where the UE is the channel sounder receiver). In another example, the channel sounding receiver may be configured with a pattern or periodicity indicating the transmission of the channel sounding waveform relative to the system timing (e.g., a radio frame). This timing indication may include a periodicity, offset expressed in absolute time (e.g., seconds or milliseconds) or scheduling units (e.g., slots or symbols). In one example, the radio frame may be in accordance with the 5G "new radio" (NR) radio frame.

Additionally, if multiple frequency sub-bands or carriers are configured for the channel sounding receiver to receive a channel sounding waveform, or channel sounding waveforms (e.g., for carrier aggregation), the configuration may include information regarding the associated frequency location(s) (or hopping pattern) associated with a given time location. Accordingly, the channel sounding receiver may attempt to detect the channel sounding signal at the configured locations and may switch off components of the receiver chain between channel sounding waveform transmission instances, or may continue monitoring downlink radio frames for normal control/data channel transmissions.

In another example, the channel sounding receiver may operate without a copy and/or characterization parameters of the predetermined bit sequence and/or the channel sounding waveform that is generated therefrom. Instead, the channel sounding receiver may attempt to blindly detect the channel sounding waveform and upon successfully processing a transport block matching the preconfigured sounding signal characteristics (e.g., after a cyclic redundancy check (CRC) pass detection), proceed to process the sequence as part of its configured channel sounding measurement procedure.

The following relates to all of the first, second, and third examples described above. In one example, for purposes of calibration and account for unknown parameters, such as power level, antenna gain, and beam pattern, for each beam sweep the channel sounding receiver may be placed near the base station transmitter/antennas in several line-of-sight (LOS) places. By sounding the channel in a three-dimensional (physical/spatial) grid up close to the transmitting antennas, the channel sounding receiver may collect a spatially dense sample of channel property measurements related to channel. This dense three-dimensional information can then be used to reverse engineer various unknown parameters, such as the power, antenna gain, beam pattern of the beam sweep, and so forth.

For all of the first, second, and third examples described above, the channel sounder, or channel sounding receiver, may comprise a user equipment (UE) that is equipped to operate according to the specification of the considered wireless cellular communications standard (e.g., 5G MIMO and/or millimeter wave). However, the UE may be configured with additional capabilities, including the ability to beam sweep the receive beam, the ability to log the multiple-input multiple-output (MIMO) channel response, and the ability to use the MIMO channel response to derive small scale and large scale parameters (channel property measurements) that characterize the channel. In addition, in one example the sounder receiver may comprise a system that includes a user equipment (UE) for communications with the base station transmitter and a channel sounder receiver unit. For example, the UE may be implemented via a universal serial bus (USB) dongle that allows a channel sounder receiver software to run as an application on a processing unit, e.g., of a computer that connects via the (USB) interface with a UE modem on the USB dongle.

With respect to all of the first, second, and third examples described above, the channel sounding receiver may exchange control information with the base station transmitter that is used for channel sounding. In one example, the UE functions of the channel sounding receiver could either be of the same standard/release as the cellular base station transmitter that acts as the channel sounding transmitter or of a different standard/release (e.g., 3GPP 4G/Long Term Evolution (LTE), 5G new radio (NR), or other set(s) of specifications). For example, in case of the UE being according to the specification of the considered wireless cellular communications standard (e.g., 5G NR) but with some additional capabilities, both the UE and the cellular base station transmitter that acts as sounder could be implemented according to the NR specifications notwithstanding the additional capabilities of the sounder transmitter at the base station side and the sounder receiver at the UE side. Alternatively, the base station could be implemented according to the NR specifications with additional capabilities to act as sounder transmitter. However, the base station may exchange the control information with the channel sounding receiver via an LTE air interface. Notably, using the LTE air interface for the control signaling may increase the range of the channel sounding capability beyond what would be possible if it was solely operating in millimeter wave spectrum using NR technology.

With respect to all three of the examples above, the channel sounding receiver may not implement the entire protocol stack according to the specification of the wireless cellular communications standard associated with the channel for which channel properties are to be measured (e.g., 5G NR). For example, the channel sounding receiver may only implement or utilize the subset of functions that is required for the purpose of channel sounding. In one example, the channel sounding receiver may control the base station transmitter, e.g., by providing channel sounding waveforms, instructions as to when and how to transmit channel sounding waveforms, and so forth. However, in another example, the base station that is used for channel sounding may control the channel sounding receiver. In addition, in one example the roles of the base station and channel sounding can be reversed. In other words, a channel sounder receiver can also be integrated with a base station, in which case the channel sounding transmitter is integrated with a user equipment. In one example, the role of the base station can be implemented in a second UE. In other words, channel sounding receiver can be one UE and channel sounding transmitter can be another UE. In this case, a direct UE-to-UE (e.g., sidelink) is used for channel sounding.

In all of the examples described herein, a channel sounding waveform may be a wideband signal as transmitted by the 5G base station. Accordingly, in one example, the channel sounding receiver (e.g., a 5G capable UE), may utilize different receive paths for receiving different portions of the channel sounding waveform that occupy different channels. In accordance with the present disclosure, the channel sounding receiver may implement intra-band carrier aggregation and/or inter-band carrier aggregation. Inter-band carrier aggregation may comprise receiving channel sounding waveforms via a plurality of carriers of different frequency bands (different sub-band). Intra-band carrier aggregation may comprise receiving channel sounding waveforms via a plurality of component carriers within a same frequency band (sub-band).

It should be noted that following frequency bands have been proposed for use in connection with high data rate communications of emerging 5G networks: 24.25-27.5 GHz, 31.8-33.4 GHz, 37-40.5 GHz, 40.5-42.5 GHz, 42.5-43.5 GHz, 45.5-47 GHz, 47 GHz-47.2 GHz, 47.2-50.2 GHz, and 50.4-52.6 GHz. In accordance with this proposal, a single band may be anywhere from 0.2-3.5 GHz wide. In addition, carrier bandwidths between 100 MHz-500 MHz may be utilized in connection with high data rate communications in such frequency bands. Thus, for example, a cellular network operator using 100 MHz carriers in a 40.5-42.5 GHz band may potentially transmit channel sounding waveforms across 2 GHz. From the perspective of the channel sounding receiver, this may span up to 20 component carriers for intra-band carrier aggregation.

In addition, as can be seen in the list, some of the frequency bands are contiguous and may be suitable for use in connection with inter-band carrier aggregation. In particular, component carriers from different frequency bands may be contiguous in frequency. For instance, a 5G base station may transmit a channel sounding waveform as a wideband signal that spans two (or more) frequency bands around 40.5 GHz, 42.5 GHz, 47 GHz, and/or 47.2 GHz. For instance, the base station may transmit a channel sounding waveform across 42.4-42.6 GHz. In such an example, a channel sounding receiver configured to receive via 100 MHz component carriers may utilize two 100 MHz receive paths, e.g., one for a 100 MHz component carrier centered at 42.45 GHz and another for a 100 MHz component carrier centered at 42.55 GHz. Although examples of the present disclosure are described herein with regard to contiguous component carriers (for both inter-band and intra-band carrier aggregation), in one example, a channel sounding waveform may be transmitted on non-contiguous carriers. In other words, there may be a gap of at least one component carrier in the frequency range over which a channel sounding waveform is transmitted by a 5G base station. In such an example, the channel sounding receiver may interpolate what might be received if the transmission included the channel sounding waveform on the frequencies of the omitted component carrier.

A variety of RF front end architectures may be implemented at a channel sounding receiver for carrier aggregation. For instance, the same antenna components of the channel sounding receiver may be used to receive signals across a range of frequency bands. However, some frequency bands may be received using a different set of antenna components. In addition, in cases where the same antenna components may be used to receive signals across a range of frequency bands, different RF front end circuitry may still be utilized to receive signals in the respective frequency bands. For example, the channel sounding receiver may switch to different sets of diplexers/filters to receive in one frequency band or another. In general, different receiver architectures may be utilized depending upon the region of the world and the particular frequency bands over which a 5G network provider is allowed to operate, depending upon the frequency bands in which the channel sounding receiver is designed for and/or capable of operating, depending upon the particular carrier bandwidths implemented by the network provider, and so forth. In any case, for carrier aggregation-based channel sounding in accordance with the present disclosure, the RF front end of a channel sounding receiver may separate received signals in to different component signals that are routed to respective baseband units, e.g., one per carrier.

Although examples of the present disclosure are applicable to a wide range of frequency bands, in one example, the present disclosure may relate to centimeter and millimeter wave systems. For instance, for all of the examples herein, the considered wireless cellular communications standard can be the Third Generation Project (3GPP) New Radio (NR) radio access technology. For the embodiments herein, the base station can be a gNB or gNodeB or base station of a 5G-RAN (fifth generation radio access network). It should be noted that for illustrative purposes, various base station systems are described herein in connection with particular quantities or values. However, base station systems of the present disclosure may include different quantities of various components, and/or operating parameters which may have any number of different values. For instance, a base station system may have a different number transmit antennas, may have antennas with different beamwidths, may utilize different frequencies, may utilize different transmit powers, and so forth. In addition, a base station system may include a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-4.

To better understand the present disclosure, FIG. 1 illustrates an example network, or system 100 in which examples of the present disclosure for channel sounding using carrier aggregation may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices 116 and 117, e.g., user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 400, and/or processing system 402 as described in connection with FIG. 4 below, and may be configured to provide one or more functions for channel sounding using carrier aggregation, and for performing various other operations in accordance with the present disclosure. For instance, cell sites 111-113 and/or baseband units within BBU pool 114 may be configured to perform functions such as those described below in connection with the example method of FIG. 3. For instance, cell site 113 may receive a notification of a presence of channel sounder 120, may transmit to or receive from the channel sounder 120 test channel sounding waveforms and/or characterization parameters, including timing information, signal bandwidth, signal power, carrier identification(s), sub-band index/sub-carrier identification, sub-carrier density, and the like, may transmit the channel sounding waveforms via the "channel" for which the channel property or properties is/are to be measured (e.g., a wideband transmission for carrier aggregation at the channel sounder 120), and so forth.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

In one example, the channel sounder 120 may be used to determine measures of various wireless channel parameters (broadly "channel sounding"). In one example, channel sounder 120 may comprise a user equipment (UE), e.g., a mobile endpoint device comprising a cellular telephone, a smartphone, a tablet computing device, a laptop computer, or any other cellular-capable mobile telephony and computing devices. In one example, channel sounder 120 may comprise a dedicated channel sounding device.

In one example, the channel sounder 120 may be used to receive channel sounding waveforms that are transmitted in an environment, where the channel sounding waveforms, as received, may be used to calculate or determine the measures of various wireless channel parameters such as: multipath amplitude(s), phase(s), direction(s) or angle(s) of arrival, a path loss, an excess delay, a RMS delay spread, a Doppler spread, a fade rate, a complex impulse response of the wireless channel, and so forth.

In one example, the channel sounder 120 includes at least one phased array antenna that may provide a receive beam that may be steered in various receive beam directions. In one example, the channel sounder 120 may be equipped to receive channel sounding waveforms from a 5G base station, e.g., cell site 113, via intra-band carrier aggregation, inter-band carrier aggregation or both and to measure channel properties at a given location, or at various locations, in accordance with the channel sounding waveforms that are received. For instance, at a given location, channel sounder 120 may calculate a phase difference between channel sounding waveforms received via respective receive beam directions. The processor unit may further determine an angle of arrival (AoA) based upon the receive beam directions and the phase difference. In one example, the channel sounder 120 may receive a reference copy or copies of the channel sounding waveforms(s) and/or a set of parameters characterizing the channel sounding waveforms, from the transmitter (e.g., cell site 113). Accordingly, the channel sounder 120 may determine a carrier-to-interference (CIR) ratio by comparing a received sequence with a reference copy. Alternatively, or in addition, the channel sounder 120 may calculate a path loss, an excess delay, a RMS delay spread, a fade rate, a Doppler spread, a complex impulse response, or the like, from the digital representations of the channel sounding waveforms.

In one example, the channel sounder 120 may perform further functions, including communicating with a transmitter-side device (e.g., cell site 113) to coordinate the timing of the transmission of the channel sounding waveforms with activations and deactivations of antenna sector units, to receive reference copies of channel sounding waveforms that are transmitted, and so forth. For instance, the channel sounder 120 may maintain a communication link, such as via control signaling communications or an out-of band wireless link (e.g., using a different set of antennas and a different RF communication band than the antenna sector units that are used for channel sounding/channel property measurements in accordance with the present disclosure) to communicate with cell site 113.

In one example, the channel sounder 120 may comprise all or a portion of a computing device or system, such as computing system 400, and/or processing system 402 as described in connection with FIG. 4 below, and may be configured to provide one or more functions for channel sounding using carrier aggregation, and for performing various other operations in accordance with the present disclosure. For instance, channel sounder 120 may be configured to perform functions such as those described below in connection with the example method of FIG. 3. In addition, an example channel sounder (e.g., a receiver device, or UE) is described in greater detail below in connection with the example of FIG. 2.

In one example, channel sounding receiver may control a channel sounding via an in-service base station, e.g., by instructing cell site 113 or another channel sounding transmitter to begin transmission of channel sounding waveforms, by providing test copies and/or parameters characterizing the channel sounding waveforms, including bandwidth, periodicity, and bit sequences, and so forth. In addition, channel sounding receiver may obtain and store channel property measurements, and may perform additional operations based upon the channel property measurements, such as determining locations and/or orientations for deployment of customer premises equipment, e.g., for fixed wireless broadband (FWB), or the like. However, in another example, channel sounder 120 may be controlled by another device, such as cell site 113. For instance, channel sounder 120 may receive test copies or characterization parameters of channel sounding waveforms from cell site 113, may measure channel properties in accordance with the test copies or characterization parameters, and may transmit the measured channel properties to cell site 113. For example, cell site 113 or another component of telecommunication network 170 may then aggregate channel property measures, and may determine locations and/or orientations for deployment of customer premises equipment, e.g., for fixed wireless broadband (FWB), or the like, based upon the channel property measures, and so forth.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 400, and/or processing system 402 as described in connection with FIG. 4 below, specifically configured to provide one or more service functions in accordance with the present disclosure, such as a network-based secure data storage for channel sounding records (broadly "channel property measurements"). For instance, cell site 113 may collect channel property measurements from channel sounder 120 and may forward the channel property measurements to AS 145 for storage. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas or the like, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

In one example, SON/SDN controller 190 may comprise all or a portion of a computing device or system, such as computing system 400, and/or processing system 402 as described in connection with FIG. 4 below, and may be configured to provide one or more functions to support examples of the present disclosure for channel sounding using carrier aggregation, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause various operations in connection with the example of FIG. 3 to be performed. For instance, SON/SDN controller 190 may store such configuration code and provision the code to the respective component(s), or may direct the respective component(s) to obtain the configuration code from another repository.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations in connection with channel sounding using carrier aggregation, and for performing various other operations in accordance with the present disclosure. For instance, AS 130 may select channel sounding waveforms to be used for channel property measurements, may provide the channel sounding waveforms to base stations for transmission, may provide test copies and/or characterization parameters of channel sounding waveforms to channel sounding receivers, such as channel sounder 120, and so forth. In this regard, AS 130 may maintain communications with BBU pool 114, cell sites 111-113, channel sounder 120, and so forth, via PDN gateway 110 and SGW 108, for example. AS 130 may also receive channel property measurements from channel sounding receivers via respective base stations, and may perform other operations based upon the channel property measurements that are received. For instance, AS 130 may select a location and/or orientation of a customer premises equipment (CPE), based upon the channel property measurements. For example, channel sounding via cell site 113 and channel sounder 120 may be performed at several candidate locations for a CPE, and a location (and/or orientation) with the highest signal to interference and noise ratio (SINR), may be selected. In one example, AS 130 may collect and store channel property measurements locally, e.g., in an internal or attached storage device, or remotely, e.g., in a cloud based data storage infrastructure, or the like. For instance, AS 130 may store the channel property measurements in AS 145 of service network 140, may retrieve the channel property measurements to calculate a preferred CPE location and/or orientation, or to perform other operations in accordance with the present disclosure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

It should also be noted that the foregoing is described primarily in connection with examples where channel sounding is performed with respect to cell site 113 and channel sounder 120. However, in other, further, and different examples, channel sounding may be performed at cell site 111 or cell site 112. For instance, channel sounder 120 may be deployed within communication and/or reception range of cell site 111 or cell site 112, and channel sounding waveforms may be transmitted by cell site 111 or cell site 112, respectively. In addition, although channel sounder 120 comprises a dedicated channel sounding receiver in one example, it should be noted that examples of the present disclosure may also utilize UE 116, UE 117 or other mobile endpoint devices as a channel sounding receiver. For instance, UE 116 and/or UE 117 may include a MIMO antenna to receive multi-path and/or spatial diversity signals, a GPS to determine location(s), a gyroscope and compass to determine orientation(s), and so forth. Thus, in one example, UE 116 and/or UE 117 may comprise all or a portion of a computing device or system, such as computing system 400, and/or processing system 402 as described in connection with FIG. 4 below, and may be configured to perform various operations for channel sounding using carrier aggregation, and for performing various other operations in accordance with the present disclosure.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for managing channel sounding via an in-service base station in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
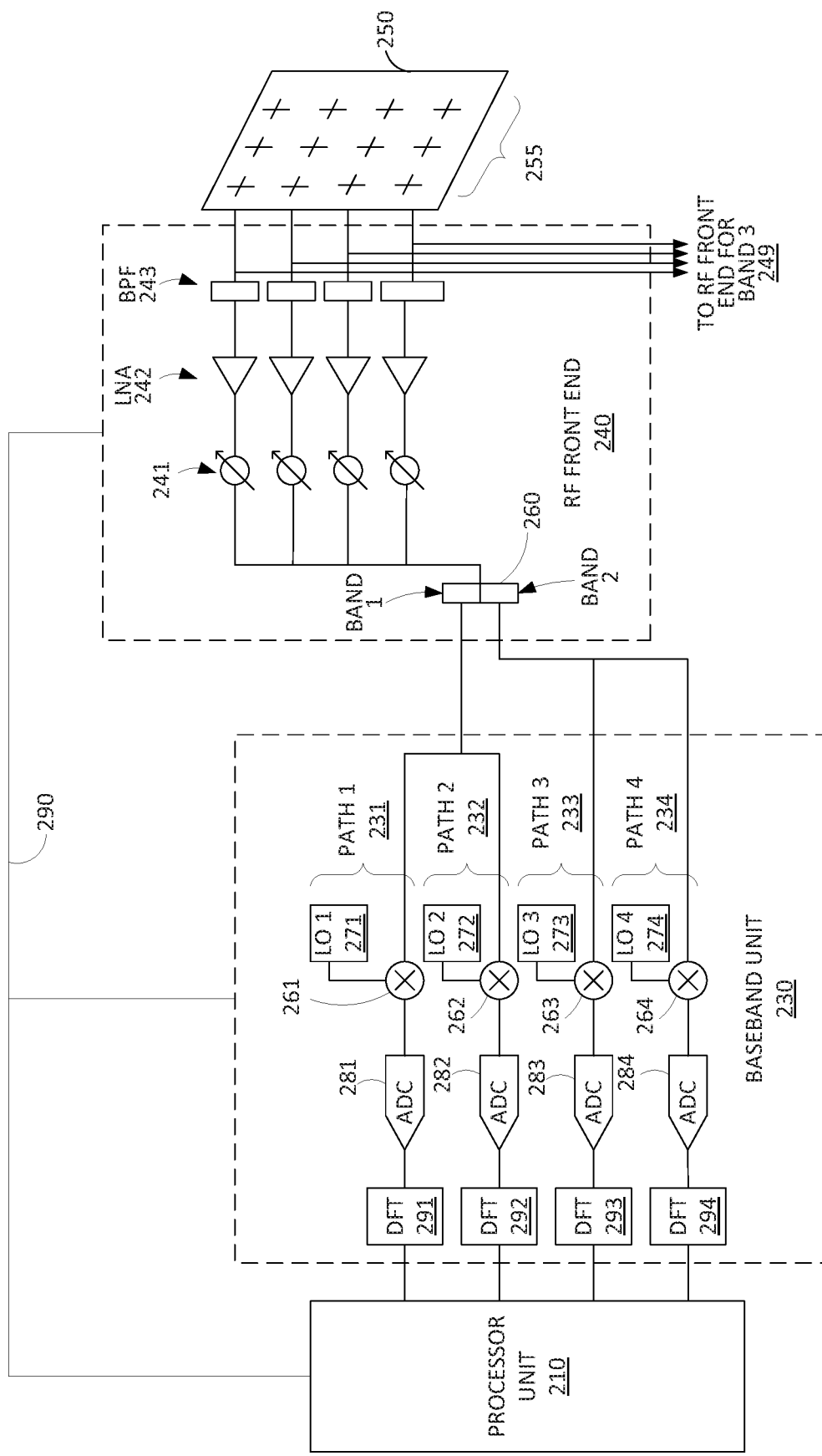
FIG. 2 illustrates a portion of an example receiver device for channel sounding using carrier aggregation, in accordance with the present disclosure.

FIG. 2 illustrates a portion of an example receiver device 200 (e.g., a channel sounder and/or or UE that is equipped for channel sounding using carrier aggregation), in accordance with the present disclosure. As illustrated in FIG. 2, a receiver device 200 includes a phased array antenna 250 having a plurality of antenna elements 255. The phased array antenna 250 may be coupled to a radio frequency (RF) front end 240. RF front end 240 may comprise a circuit between the phased array antenna 250 and a baseband unit 230 (e.g., a 5G radio receiver, or transceiver). In the example of FIG. 2, the RF front end 240 includes a plurality of filters 243 (e.g., band-pass filters), a plurality of low noise amplifiers 242, and plurality of variable phase shifters 241, e.g., one per antenna element. It should be noted that phased array antenna 250 may comprise a two-dimensional grid of antenna elements 255. However, for illustrative purposes, only a portion of the RF front end associated with four of the antenna elements 255 is shown in FIG. 2. The plurality of variable phase shifters 241 may output signals to a combined signal path that is fed to a diplexer 260. In one example, the diplexer filters the received RF signals with respect to a first frequency band (e.g., band 1) and a second frequency band (e.g., band 2). In one example, the receiver device 200 may control the plurality of variable phase shifters 241 to steer a receive beam across a range of receive beam directions in azimuth and elevation.

It should be noted that in the present example, band 1 and band 2 may be contiguous bands in frequency such that a shared RF front end 240 may be used with filters 243 that are applicable to both band 1 and band 2. However, in one example, other frequency bands that are not contiguous or which are too far apart in frequency (such as a "band 3") may still be received via the phased array antenna 250 and antenna elements 255, but may be received and processed via a different RF front end 249.

Baseband unit 230 may include a plurality of receive paths (e.g., receive paths 1-4 (231-234)). Each of the receive paths may include a respective local oscillator (LO) 271-274, a respective RF-to-baseband downconverter 261-264 (e.g., a multiplier), a respective analog-to-digital converter 281-284, and a respective discrete Fourier transform (DFT) block 291-294. Each of the RF-to-baseband downconverters 261-264 is controlled by an associated local oscillator (LO) 271-274 to down-convert received RF signals to a baseband frequency range. In one example, the respective local oscillators (LOs) 271-274 are tuned for the respective component carriers that are associated with, or assigned to each of the receive paths 231-234. The RF-to-baseband downconverters 261-264 feed ADCs 281-284, respectively. ADCs 281-284 may sample the analog baseband signals to output digital baseband signals. For instance, ADCs 281-284 may oversample the analog baseband signals at sampling intervals under the control of timing signals from a clock circuit (e.g., including a rubidium reference clock or the like) to create per-carrier time domain sample sets that represent the channel sounding waveform.

ADCs 281-284 may feed the DFT blocks 291-294 respectively. In one example, the DFT blocks 291-294 process the per-carrier time domain sample sets (e.g., a discrete Fourier transform operation is applied) to generate per-carrier frequency domain sample sets. As illustrated in FIG. 2, the DFT blocks 291-294 may output the per-carrier frequency domain sample sets to a processor unit 210 that is configured to perform various operations for determining measures of wireless channel parameters, as described herein. For example, for each channel sounding waveform that is received, processor unit 210 may align the per-carrier time domain sample sets in gain and phase. For instance, where the component carriers are contiguous in frequency, the per-carrier time domain sample sets for the contiguous/adjacent component carriers should be aligned in gain and phase. Thus, the processor unit 210 may correct for any misalignments at the frequency edges of the component carriers and output a combined frequency domain sample set that is representative of the wideband channel sounding waveform that is received via phased array antenna 250. In one example, channel properties may be measured or calculated in the frequency domain, e.g., using the combined frequency domain sample set (or multiple successive combined frequency domain sample sets). Alternatively, or in addition, the combined frequency domain sample set may be processed via an inverse discrete Fourier transform block (IDFT) (not shown) to provide a combined time domain sample set that is that is representative of the wideband channel sounding waveform that is received. In such an example, processor unit 210 may then calculate, based upon the digital representations of the channel sounding waveform in the time domain, various channel property measures.

To illustrate, the processor unit 210 may calculate, based upon the digital representations of the channel sounding waveforms, various measurements of wireless channel parameters, such as: a complex impulse response, a path loss, an RSS, a CIR, an excess delay, an RMS delay spread, an angular spread, a Doppler spread, a fade rate, an AoA, and so forth. In one example, the processor unit 210 may receive a reference copy or copies of the channel sounding waveform(s), from a 5G base station transmitter. Accordingly, the processor unit 210 may determine a complex impulse response, a path loss, an RSS, a CIR, an excess delay, an RMS delay spread, an angular spread, a Doppler spread, a fade rate, an AoA, and so forth by comparing the digital representation of the channel sounding waveform received via phased array antenna 250 with a reference copy. In one example, the processor unit 210 may comprise all or a portion of a computing device or system, such as system 400, and/or processor 402 as described in connection with FIG. 4 below.

In one example, the processor unit 210 may perform further functions, such as communicating with the 5G base station transmitter to receive reference copies of channel sounding waveforms or characterization parameters of the channel sounding waveform(s) that are transmitted. The characterization parameters may include: a transmit power, a waveform/sequence indication, a timing indication (e.g., transmission duration, periodicity, offset, and the like), a frequency location (e.g. carrier identification(s), sub-band index, sub-carrier density, grid alignment, transmission bandwidth), and so forth. As just one example, a primary synchronization signal (PSS) of a synchronization signaling (SS) block is extended in frequency to create a wideband signal without changing the narrowband part of the PSS which a UE would expect (e.g., if the UE is operating according to 5G or similar wireless communications standard that specifies a narrowband PSS). These parameters may be provided by higher layer signaling (e.g., at the radio resource control (RRC) layer), via pre-configuration, or at the application layer.

In one example, the processor unit 210 may communicate with the 5G base station transmitter to coordinate the timing of the transmission of the channel sounding waveforms. For instance, some of the channel sounding waveforms may comprise broadcast signals and/or reference signals that are transmitted regardless of the presence of processor unit 210. However, other channel sounding waveforms may be transmitted on a physical downlink shared channel (PDSCH), in a blank resource of a time and frequency resource grid of the 5G base station transmitter, and so forth. Accordingly, in one example, processor unit 210 may request "on-demand" transmission of channel sounding waveforms. Thus, the network may conserve resources and mitigate potential sources of interference for other user data by avoiding transmission of the channel sounding waveform/sequences unless receiver device 200, or another channel sounding receiver device, is present and actively taking measurements.

In one example, processor unit 210 may adjust the phase delays of variable phase shifters 241 via control lines 290. In one example, the pass band of filters 243 may also be controlled via control lines 290. The control of these elements of RF front end 240 may be based upon the various criteria, including the known or expected bit sequences of the channel sounding waveform(s) and/or other characterization parameters of the channel sounding waveform(s). In one example, the processor unit 210 may also configure components of baseband unit 230, such as ADCs 281-284 and/or local oscillators 271-274, to function in a particular manner, e.g., based upon the characterization parameters and the expected characteristics of the channel sounding waveform(s) that are received.

In one example, certain measurements of wireless channel parameters may be determined in baseband unit 230, e.g., as an alternative or in addition to determining measurements of wireless channel parameters by processor unit 210. For instance, baseband unit 230 may include a programmable logic device (PLD), such as a field programmable gate array (FPGA), or the like. Accordingly, in one example, the baseband unit 230 may be configured to determine measurements of one or more wireless channel parameters. In such an example, the baseband unit 230 may forward measurements of one or more wireless channel parameters to processor unit 210, e.g., for further tagging with location and/or spatial orientation information.

It should also be noted that FIG. 2 illustrates one receive path of device 200 that includes phased array antenna 250. However, device 200 may include a plurality of additional phased array antennas, RF front ends, and baseband units coupled to processor unit 210 that are the same or substantially similar to the portion of device 200 illustrated in FIG. 2. Thus, processor unit 210 may also control aspects of other RF front ends to steer receive beams via respective phased array antennas, to digitally sample baseband down-converted signals based upon the characterization of the channel sounding waveform(s), to create per-carrier time domain and frequency domain sample sets, to perform gain and phase alignment to generate combined sample sets, and so forth.

It should also be noted that the example of FIG. 2 provides just one example of a receive path of a receiver device in accordance with the present disclosure. For example, another receiver device may be utilized that includes a different RF front end with switches, duplexers, and the like. In one example, the antenna elements 255 may comprise dual polarization antenna elements. However, for ease of illustration, the portion of device 200 depicted in FIG. 2 may be related to one of the polarizations. Similarly, a receive portion of device 200 is illustrated in FIG. 2. However, it should be understood that in one example, receiver device 200 may also include transmit/uplink components. Thus, these and other modifications are all contemplated within the scope of the present disclosure.

Figure 3:
FIG. 3 illustrates a flowchart of an example method for channel sounding using carrier aggregation, in accordance with the present disclosure.

FIG. 3 illustrates a flowchart of an example method 300 for channel sounding using carrier aggregation, in accordance with the present disclosure. In one example, steps, functions and/or operations of the method 300 may be performed by a receiver device as illustrated in FIG. 1, e.g., a channel sounding receiver, a mobile endpoint device, and/or a UE, or any one or more components thereof, such as a processing system, a USB cellular dongle, a Global Positioning System (GPS) unit, a phased array antenna, and so forth. In one example, the steps, functions, or operations of method 300 may be performed by a computing device or system 400, and/or a processing system 402 as described in connection with FIG. 4 below. For instance, the computing device 400 may represent at least a portion of a channel sounding receiver in accordance with the present disclosure. For illustrative purposes, the method 300 is described in greater detail below in connection with an example performed by a processing system, such as processing system 402. The method 300 begins in step 305 and may proceed to any of optional steps 310-330, or to step 340.

At optional step 310, the processing system (e.g., of a channel sounding receiver) may transmit to a base station, a notification that the channel sounding receiver is ready to measure a channel property. The base station may comprise a 5G base station, e.g., a gNodeB (also referred to a gNB or "new radio"). The notification may include an instruction to transmit a channel sounding waveform via a plurality of carriers (e.g., two or more component carriers within a same frequency band or in different frequency bands). In one example, the instruction may further include characterization parameters of the channel sounding waveform. The characterization parameters may include: a transmit power, a waveform/sequence indication, a timing indication (e.g., transmission duration, periodicity, offset, and the like), a frequency location (e.g. carrier identification(s), sub-band index, sub-carrier density, grid alignment, transmission bandwidth), and so forth.

In one example, the notification is sent via at least one of: radio resource control signaling, preconfiguration signaling, or application layer signaling. In one example, the notification is sent via out-of-band signaling. For example, a first portion of the base station may comprise 3GPP 5G infrastructure and a second portion of the base station comprises 3G, 4G, or 4G/LTE infrastructure. In addition, the channel sounding of the method 300 may be with respect to a 5G channel using the first portion of the base station. In such case, the out-of-band signaling may be using the second portion of the base station (e.g., 3G, 4G, or 4G/LTE infrastructure). The use of the previous generation cellular infrastructure (e.g., LTE) for signaling extends the measurement range beyond what would typically be used to support user data per 5G (e.g., millimeter wave frequencies for fixed wireless broadband (FWB) for example. In one example, the out-of-band signaling could also be through Wi-Fi or WiMAX (if the base station and channel sounding receiver are both so equipped).

At optional step 320, the processing system may receive characterization parameters of the channel sounding waveform from the base station. The characterization parameters may be provided via radio resource control signaling, preconfiguration signaling, application layer signaling, and/or out-of-band signaling. In one example, the characterization parameters may be the same as or similar to those described above in connection with optional step 310. It should be noted that in one example, a channel sounding process of the method 300 is controlled by the receiver device, while in another example, the channel sounding process is controlled by the base station. Thus, in one example, characterization parameters may be selected by the receiver device and included in the characterization parameters of the notification of optional step 310, or may be selected by the base station and transmitted as characterization parameters at optional step 320.

At step 330, the processing system receives, from the base station, at a location, a channel sounding waveform via a plurality of carriers. The plurality of carriers may comprise adjacent carriers in a frequency band. Alternatively, or in addition, the plurality of carriers may comprise adjacent carriers from different frequency bands. In still another example, the plurality of carriers may comprise non-adjacent carriers from within the same frequency band or from different frequency bands. In one example, each of the plurality of carriers occupies a bandwidth of 200 MHz or less while the channel sounding waveform may occupy a bandwidth of at least 400 MHz. In one example, the channel sounding waveform comprises at least one time/frequency resource block of a time and frequency resource grid implemented at the base station. For example, the channel sounding waveform may comprise, a reference signal, a frequency-extended synchronization signal (e.g., a PSS or the like that is extended beyond a narrowband 40 MHz frequency range of an SS block), a signal transmitted via a physical downlink shared channel (PDSCH), or a signal transmitted via a blank resource of a time and frequency resource grid of the base station.

In one example, the processing system may tune an antenna receiver system to receive the channel sounding waveform via a predetermined pattern. For instance, the processing system may align a receiver with the frequency sub-carrier(s) at the time(s) corresponding to the time/frequency resource(s) identified in the characterization parameters sent at optional step 310 or received at optional step 320, may steer a receiver gain pattern, and so forth. In another example, the processing system may attempt to blindly detect the channel sounding waveform and upon successfully processing a transport block matching the pre-configured sounding signal characteristics (e.g., after a cyclic redundancy check (CRC) pass detection), proceed to process the sequence as part of its configured channel sounding measurement procedure. In one example, the receiver device includes an RF front end that is arranged for intra-band carrier aggregation and inter-band carrier aggregation.

At step 340, the processing system samples the channel sounding waveform via the plurality of carriers to generate a plurality of per-carrier time domain sample sets. In one example, the receiver device includes a baseband units that includes a plurality of receive paths. In one example, each of the receive paths may include a respective local oscillator, a respective RF-to-baseband downconverter, a respective analog-to-digital converter (ADC), and a respective discrete Fourier transform (DFT) block. In one example, the sampling the channel sounding waveform via the plurality of carriers at step 340 is performed via the plurality of analog-to-digital converters. For example, the RF-to-baseband downconverters in conjunction with the local oscillators may generate analog baseband signals to provide to the respective ADCs. The ADCs may therefore sample the analog baseband signals to output digital baseband signals. For instance, the ADCs may oversample the analog baseband signals at sampling intervals under the control of timing signals from a clock circuit (e.g., including a rubidium reference clock or the like) to create per-carrier time domain sample sets that represent the channel sounding waveform.

At step 350, the processing system processes the per-carrier time domain sample sets via a plurality of discrete Fourier transform modules. In other words, a discrete Fourier transform operation is applied to the per-carrier time domain sample sets associated with each of the plurality of carriers. Accordingly, the result of step 350 may comprise a plurality of per-carrier frequency domain sample sets that are outputs of the respective discrete Fourier transform operations. As mentioned above, the receiver device may include respective receive paths for each of the component carriers, each of which may include one of the discrete Fourier transform modules.

At step 360, the processing system aligns the plurality of per-carrier frequency domain sample sets in gain and phase, wherein the aligning provides a combined frequency domain sample set. For instance, where the component carriers are contiguous in frequency, the per-carrier time domain sample sets for the contiguous/adjacent component carriers should be aligned in gain and phase. Thus, the processing system may correct for any misalignments at the frequency edges of the component carriers and output a combined frequency domain sample set that is representative of the wideband channel sounding waveform that is received.

At step 370, the processing system measures the channel property at the location based upon the combined frequency domain sample set (and in one example, further based upon the characterization parameters). In one example, channel properties may be measured or calculated in the frequency domain, e.g., using the combined frequency domain sample set (or multiple successive combined frequency domain sample sets). Alternatively, or in addition, the combined frequency domain sample set may be processed via an inverse discrete Fourier transform block (IDFT) to provide a combined time domain sample set that is that is representative of the wideband channel sounding waveform that is received. In such an example, the processing system may then calculate, based upon the digital representations of the channel sounding waveform in the time domain, various channel property measures.

Various channel properties as described above may be measured at step 370, such as a complex impulse response, a path loss, an RSS, a CIR, an excess delay, an RMS delay spread, an angular spread, a Doppler spread, a fade rate, an AoA, and so forth. In one example, the processing system may receive a reference copy or copies of the channel sounding waveform(s), from a 5G base station transmitter or may receive or possess characterization parameters that define the channel sounding waveform(s). Accordingly, the processing system may determine a complex impulse response, a path loss, an RSS, a CIR, an excess delay, an RMS delay spread, an angular spread, a Doppler spread, a fade rate, an AoA, and so forth by comparing the frequency and/or time domain digital representation(s) of the channel sounding waveform with a reference copy. In one example, the measuring the channel property may be based on the characterization parameters of the channel sounding waveform. For instance, the processing system may use the characterization parameters in comparison to a received channel sounding waveform to determine one or more channel properties. The channel property may be associated with various layers of the receiver protocol stack. For instance, in one example, the channel property may be associated with the physical layer and does not require that the processing system decipher any particular bit pattern of the channel sounding waveform.

In addition, in one example, the processing system may determine the location or geographic position of the receiver device via a Global Positioning System (GPS). Alternatively, or in addition, a location may be derived using other location estimation methods, such as cell identifier (cell ID) based methods, observed time difference of arrival (OTDA) techniques, or barycentric triangulation. In one example, the processing system may also associate a channel property measurement with a particular orientation, allowing the receiver device to determine a receive beam direction/spatial orientation, and to therefore measure wireless channel parameters with high spatial accuracy. For instance, the channel sounding receiver may include a gyroscope and compass, or the like, and may determine a particular orientation of a multi-path signal, may determine a direction of a maximum received signal strength, and so forth.

In one example, the processing system may record receive beam directions with respect to a local coordinate system that is aligned to a chassis of the receiver device (and thus known to the processing system according to the specific design). In one example, the processing system may then map or translate receive beam directions in the local coordinate system into a global coordinate system. For instance, a global coordinate system may have two dimensions corresponding to a planar estimation of the surface of the Earth (e.g., a "u" axis and "v" axis), with the third dimension (e.g., a "w" axis) being normal to the plane. In addition, the planar estimation of the surface of the Earth can also be aligned such that one dimension is north-south (e.g., the "v" axis) and another dimension is east-west (e.g., the "u" axis). Accordingly, the orientations of three axis of the local coordinate system relative to the (u, v, w) axis of global coordinate system may be determined from a gyroscope and compass of the receiver device.

At optional step 380, the processing system may transmit the channel property and an identification of the location to the base station. In one example, spatial orientation information (e.g., angle of arrival and/or a receive beam direction associated with the channel property measurement) may also be transmitted to the base station. For instance, in one example, a channel sounding process according to the method 300 may be controlled by a base station. In such an example, the processing system of the receiver device may receive the channel sounding waveform and measure the channel property or properties. However, the base station (or other network-based devices) may perform automated actions based upon the channel property measurements, such as determining whether location is a candidate for a deployment of a customer premises, determining whether to activate and deactivate base station antennas/remote radio heads, baseband units in a BBU pool, and so on. Following step 370 or optional step 380, the method 300 proceeds to step 395 where the method ends.

It should be noted that the method 300 may be expanded to include additional steps or may be modified to include additional operations with respect to the steps outlined above. For example, the method 300 may be repeated through various cycles of channel property measurements. For instance, the processing system may receive multiple channel sounding waveforms at a location via different receive beam directions, at different times, and so on. Thus, in one example, the receiving and measuring may be performed over multiple channel sounding waveform bursts (e.g., for as many bursts as the channel sounding receiver selects, for as many receive beam directions as the channel sounding receiver wants to obtain measurements, for as many reference signal sweeps of the base station as the channel sounding receiver is configured or programmed to wait for, and so on). Thus, these and other modification are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 4:
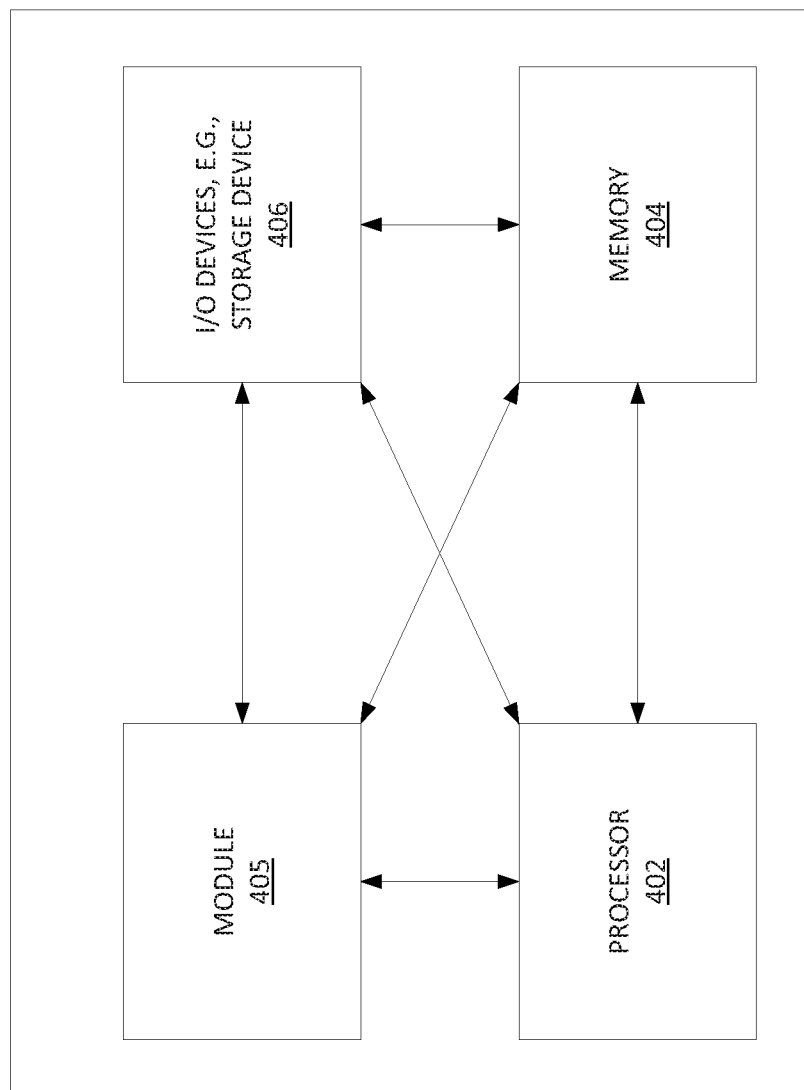
FIG. 4 illustrates an example of a computing device, or computing system, specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for channel sounding using carrier aggregation, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., where the steps of the above method 300 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for channel sounding using carrier aggregation (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for channel sounding using carrier aggregation (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, from a base station by a processing system of a channel sounding receiver including at least one processor, at a location, a channel sounding waveform via a plurality of carriers;
   sampling, by the processing system, the channel sounding waveform via the plurality of carriers to generate a plurality of per-carrier time domain sample sets;
   processing, by the processing system, the plurality of per-carrier time domain sample sets via at least one transform module, wherein the processing provides a plurality of per-carrier frequency domain sample sets;
   aligning, by the processing system, the plurality of per-carrier frequency domain sample sets in gain and phase, wherein the aligning provides a combined frequency domain sample set; and
   measuring, by the processing system, a channel property at the location based upon the combined frequency domain sample set.

2. The method of claim 1, further comprising:
   transmitting the channel property and an identification of the location to the base station.

3. The method of claim 1, wherein the plurality of carriers is associated with a plurality of receive paths of a baseband unit of the channel sounding receiver.

4. The method of claim 3, wherein the sampling the channel sounding waveform via the plurality of carriers is performed via analog-to-digital converters of the plurality of receive paths of the baseband unit.

5. The method of claim 1, further comprising:
   receiving characterization parameters of the channel sounding waveform from the base station, wherein the measuring of the channel property is further based on the characterization parameters of the channel sounding waveform.

6. The method of claim 5, wherein the characterization parameters include:
   an identification of the plurality of carriers.

7. The method of claim 6, wherein the characterization parameters include:
   a sub-carrier density of the plurality of carriers.

8. The method of claim 1, further comprising:
   transmitting, by the processing system to the base station, a notification that the channel sounding receiver is ready to measure the channel property.

9. The method of claim 8, wherein the notification includes an instruction to transmit the channel sounding waveform via the plurality of carriers, wherein the instruction includes characterization parameters of the channel sounding waveform, and wherein the measuring of the channel property is further based on the characterization parameters of the channel sounding waveform.

10. The method of claim 1, wherein the base station comprises a gNodeB.

11. The method of claim 1, wherein the plurality of carriers comprises adjacent carriers in a frequency band.

12. The method of claim 1, wherein the plurality of carriers comprises adjacent carriers from different frequency bands.

13. The method of claim 1, wherein the channel sounding waveform occupies a bandwidth of at least 400 MHz.

14. The method of claim 1, wherein each of the plurality of carriers occupies a bandwidth of 200 MHz or less.

15. The method of claim 1, wherein the channel sounding waveform comprises:
   at least one time/frequency resource block of a time and frequency resource grid implemented at the base station.

16. The method of claim 1, wherein the channel sounding waveform comprises:
   a reference signal;
   a frequency-extended synchronization signal;
   a signal transmitted via a physical downlink shared channel; or
   a signal transmitted via a blank resource of a time and frequency resource grid of the base station.

17. The method of claim 1, wherein the channel sounding receiver includes a radio frequency front end that is arranged for intra-band carrier aggregation and inter-band carrier aggregation.

18. A non-transitory computer-readable medium storing instructions which, when executed by a processing system of a channel sounding receiver including at least one processor, cause the processing system to perform operations, the operations comprising:
   receiving, from a base station, at a location, a channel sounding waveform via a plurality of carriers;
   sampling the channel sounding waveform via the plurality of carriers to generate a plurality of per-carrier time domain sample sets;
   processing the plurality of per-carrier time domain sample sets via at least one transform module, wherein the processing provides a plurality of per-carrier frequency domain sample sets;
   aligning the plurality of per-carrier frequency domain sample sets in gain and phase, wherein the aligning provides a combined frequency domain sample set; and
   measuring a channel property at the location based upon the combined frequency domain sample set.

19. The non-transitory computer-readable medium of claim 18, the operations further comprising:
   transmitting the channel property and an identification of the location to the base station.

20. A device comprising:
   a processing system including at least one processor; and
   a computer-readable medium storing instructions which, when executed by the processing system, cause the processing system to perform operations, the operations comprising:
   receiving, from a base station, at a location, a channel sounding waveform via a plurality of carriers;

sampling the channel sounding waveform via the plurality of carriers to generate a plurality of per-carrier time domain sample sets;

processing the plurality of per-carrier time domain sample sets via at least one transform module, wherein the processing provides a plurality of per-carrier frequency domain sample sets;

aligning the plurality of per-carrier frequency domain sample sets in gain and phase, wherein the aligning provides a combined frequency domain sample set; and measuring a channel property at the location based upon the combined frequency domain sample set.

* * * * *